United States Patent
Kaidu et al.

(10) Patent No.: US 10,063,167 B2
(45) Date of Patent: Aug. 28, 2018

(54) MOTOR DRIVE CONTROLLER AND METHOD FOR CONTROLLING MOTOR

(71) Applicant: MINEBEA CO., LTD., Kitasaku-Gun, Nagano (JP)

(72) Inventors: Hiroyuki Kaidu, Iwata (JP); Toshihiro Tamitsuji, Iwata (JP)

(73) Assignee: Minebea Co., Ltd., Nagano (JP)

( * ) Notice: Subject to any disclaimer, the term of this patent is extended or adjusted under 35 U.S.C. 154(b) by 25 days.

(21) Appl. No.: 15/070,565

(22) Filed: Mar. 15, 2016

(65) Prior Publication Data
US 2016/0276965 A1 Sep. 22, 2016

(30) Foreign Application Priority Data
Mar. 17, 2015 (JP) ................. 2015-053426

(51) Int. Cl.
*H02P 23/12* (2006.01)
*H02P 7/00* (2016.01)
*H02P 6/182* (2016.01)
*H02P 6/15* (2016.01)

(52) U.S. Cl.
CPC .............. *H02P 6/182* (2013.01); *H02P 6/157* (2016.02)

(58) Field of Classification Search
CPC .......... H02P 6/153; H02P 6/182; H02P 6/157; H02P 27/06; H02P 6/17; H02P 29/10
USPC .................... 318/400.14, 440, 459
See application file for complete search history.

(56) References Cited

U.S. PATENT DOCUMENTS

| 2006/0170383 | A1* | 8/2006 | Narumi | H02P 6/182 318/400.04 |
|---|---|---|---|---|
| 2008/0252240 | A1* | 10/2008 | Sugie | H02P 6/15 318/400.06 |
| 2009/0153086 | A1* | 6/2009 | Narumi | H02P 6/18 318/400.35 |
| 2011/0095714 | A1 | 4/2011 | Kagawa | |
| 2014/0210379 | A1* | 7/2014 | Kato | H02P 6/15 318/139 |

(Continued)

FOREIGN PATENT DOCUMENTS

| JP | H11-187691 A | 7/1999 |
|---|---|---|
| JP | 2002-010675 A | 1/2002 |

(Continued)

OTHER PUBLICATIONS

Office Action dated Sep. 26, 2017 in the corresponding Japanese patent application No. 2015-053426.

*Primary Examiner* — Eduardo Colon Santana
*Assistant Examiner* — Gabriel Agared
(74) *Attorney, Agent, or Firm* — Carrier Blackman & Associates, P.C.; Joseph P. Carrier; Jeffrey T. Gedeon (57) ABSTRACT

A motor drive controller includes: an advance-angle reference voltage generator that generates an advance-angle reference voltage; a back electromotive voltage comparator that generates phase signals of phases at a cross timing of the advance-angle reference voltage and back electromotive voltages of phases of a motor; and a controller that operates to perform a process including: detecting a rotation speed of the motor based on the phase signals of the phases; increasing the advance-angle reference voltage when the rotation speed moves from a high speed to a low speed; and decreasing the advance-angle reference voltage when the rotation speed moves from a low speed to a high speed.

8 Claims, 4 Drawing Sheets

(56) References Cited

U.S. PATENT DOCUMENTS

2015/0002061 A1* 1/2015 Hatakeyama ............. H02P 6/18
                                                                318/400.06
2015/0318808 A1* 11/2015 Okubo ................... H02K 29/03
                                                                318/400.02

FOREIGN PATENT DOCUMENTS

| JP | 2005-312217 A | 11/2005 |
| JP | 2008-141897 A | 6/2008 |
| WO | 2009/142264 A1 | 11/2009 |

* cited by examiner

MOTOR DRIVE CONTROLLER AND METHOD FOR CONTROLLING MOTOR

BACKGROUND OF THE INVENTION

1. Field of the Invention

The present invention relates to a motor drive controller and a method for controlling a motor.

2. Description of the Related Art

In the related art, there is a drive controller for a sensorless brushless DC motor that performs advance-angle control. An example of such device is disclosed in JP-A-2005-312217.

The motor drive controller described in JP-A-2005-312217 is configured to raise and output a phase reference voltage and to generate a phase signal so as to cause an advance angle to lag, when a value of a load current detected by a load current detecting unit decreases (when a load decreases). The motor drive controller lowers and outputs an advance-angle reference voltage and generates the phase signal to cause the advance angle to advance, when the value of the detected load current increases (when the load increases). Accordingly, the motor drive controller performs optimal advance-angle control depending on the load.

In this related art motor drive controller, since a torque is required and thus the value of the load current increases at the time of rotation start of a motor, the advance reference potential is controlled to drop and decrease.

However, the motor drive controller described in JP-A-2005-312217 performs optimal advance-angle control depending on the load at the time of rotation start of the motor, but may have a problem in that it is not possible to avoid loss of synchronism.

Accordingly, there has been a demand for a motor drive controller that can perform more optimal advance-angle control.

SUMMARY OF THE INVENTION

One of objects of the present invention is to provide a motor drive controller and a method for controlling a motor that are capable of preventing loss of synchronism by performing more optimal advance-angle control.

According to an illustrative embodiment of the present invention, there is provided a motor drive controller including: an advance-angle reference voltage generator that generates an advance-angle reference voltage; a back electromotive voltage comparator that generates phase signals of phases at a cross timing of the advance-angle reference voltage and back electromotive voltages of phases of a motor; and a controller that operates to perform a process including: detecting a rotation speed of the motor based on the phase signals of the phases; increasing the advance-angle reference voltage when the rotation speed moves from a high speed to a low speed; and decreasing the advance-angle reference voltage when the rotation speed moves from a low speed to a high speed.

According to another illustrative embodiment of the present invention, there is provided a motor drive controller including: an advance-angle reference voltage generator that generates an advance-angle reference voltage; a back electromotive voltage comparator that generates phase signals of phases at a cross timing of the advance-angle reference voltage and back electromotive voltages of phases of a motor; and a controller that operates to perform a process including: detecting a rotation speed of the motor based on the phase signals of the phases; decreasing the advance-angle reference voltage when the rotation speed moves from a high speed to a low speed; and increasing the advance-angle reference voltage when the rotation speed moves from a low speed to a high speed.

According to still another illustrative embodiment of the present invention, there is provided a method for controlling a motor, the method including: detecting a rotation speed of a motor; determining which of rotation speed areas which are set stepwise depending on the rotation speed in advance the detected rotation speed of the motor belongs to; switching an advance-angle reference voltage to voltages which are set stepwise in advance depending on the determined rotation speed area of the motor; and determining whether the motor loses synchronism based on a cross timing of back electromotive voltages of phases of the motor.

DETAILED DESCRIPTION

Hereinafter, the motor shaft, the motor and the motor assembly according to the embodiments of the present invention will be described with reference to the drawings.

Figure 1:
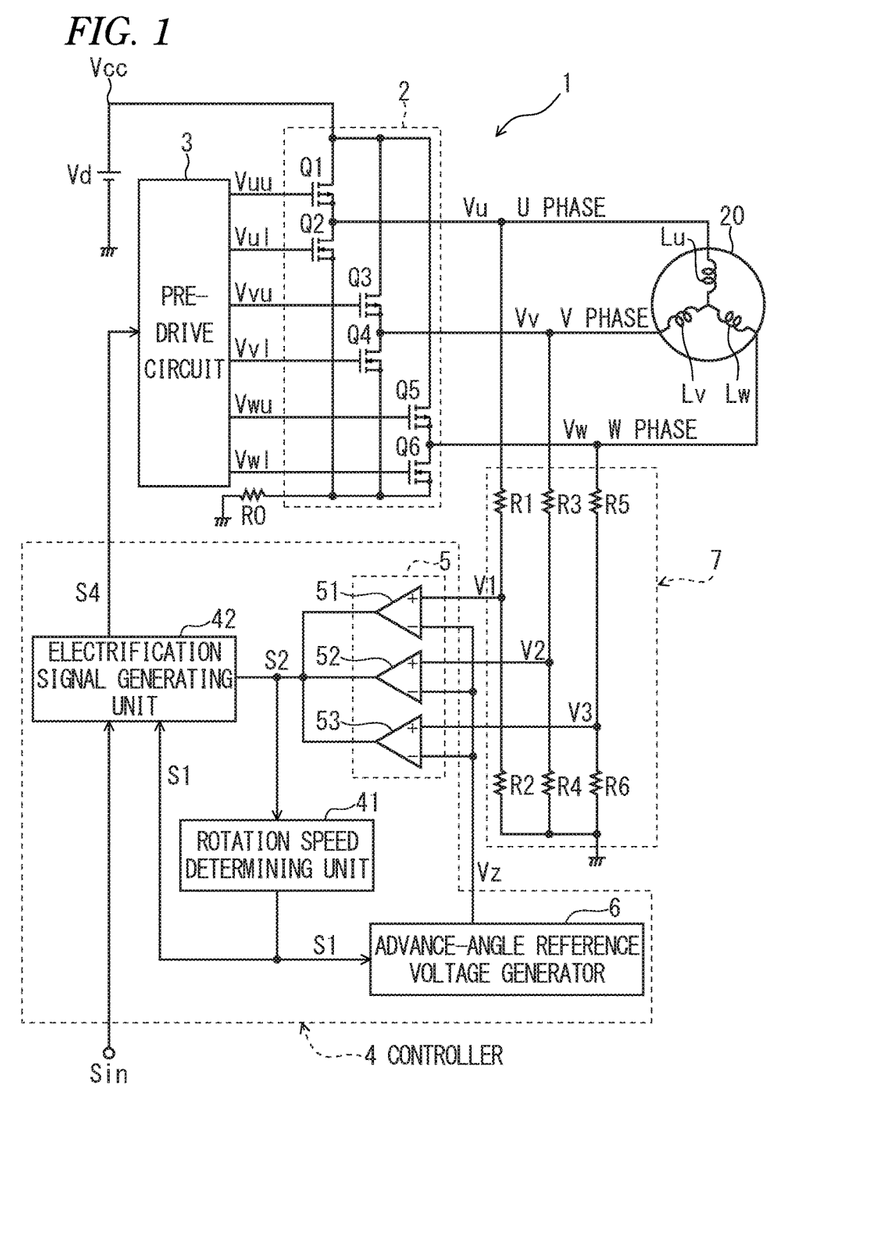
FIG. 1 is a schematic configuration diagram illustrating an example of a motor drive controller according to an embodiment of the present invention.

FIG. 1 is a block diagram illustrating a circuit configuration of a drive controller 1 of a motor 20 according to an embodiment.

In FIG. 1, the motor 20 is a three-phase sensorless brushless DC motor and includes coils Lu, Lv, and Lw of respective phases and a rotor (not illustrated). Ends of the coils Lu, Lv, and Lw are Y-connected. The other end of the coil Lu is connected to a U phase, the other end of the coil Lv is connected to a V phase, and the other end of the coil Lw is connected to a W phase. The motor 20 is rotationally driven by causing a three-phase AC current to be input to the U phase, the V phase, and the W phase from an inverter circuit 2.

The drive controller 1 of the motor 20 is a sensorless brushless motor control device that detects a rotor rotation state based on induced voltages of the coils Lu, Lv, and Lw of phases of the motor 20 and controls the motor by phase electrification control of the coils Lu, Lv, and Lw of phases of the motor 20. The drive controller 1 (an example of the motor drive controller) includes an inverter circuit 2 (a part of the motor driver) that drives the motor 20, a pre-drive circuit 3 (a part of the motor driver), a controller 4, and a detector 7.

The drive controller 1 is connected to a DC power source Vd and is connected to the motor 20 in three-phase wirings of a U-phase wiring, a V-phase wiring, and a W-phase wiring. The drive controller 1 controls rotation of the motor 20 by applying a drive voltage to the motor 20. An inter-terminal voltage Vu is applied to the U phase. An inter-terminal voltage Vv is applied to the V phase. An inter-terminal voltage Vw is applied to the W phase.

The motor driver includes the inverter circuit 2 and the pre-drive circuit 3. The DC power source Vd applies a source voltage Vcc to the motor driver to supply power thereto. The motor driver is supplied with power from the DC power source Vd and supplies a drive current to the U-phase, V-phase, and W-phase coils Lu, Lv, and Lw of the motor 20 to rotate the rotor based on a drive control signal S4 from the controller 4. The motor driver drives the motor 20 in a sinusoidal drive mode.

The inverter circuit 2 (a part of the motor driver) is connected to the DC power source Vd and is supplied with power. The inverter circuit 2 is connected to the pre-drive circuit 3 (a part of the motor driver) and the coils Lu, Lv, and Lw of phases of the motor 20. The inverter circuit 2 supplies currents to the coils Lu, Lv, and Lw of phases of the motor 20 based on drive signals Vuu to Vw1 of the pre-drive circuit 3.

The inverter circuit 2 includes a U-phase switching leg in which switching elements Q1 and Q2 are connected in series, a V-phase switching leg in which switching elements Q3 and Q4 are connected in series, and a W-phase switching leg in which switching elements Q5 and Q6 are connected in series. The switching elements Q1 to Q6 are, for example, field effect transistors (FET). The inverter circuit 2 is connected to the DC power source Vd and is also connected to a resistor R0.

The U-phase switching leg includes a switching element Q1 of upper arm side and a switching element Q2 of lower arm side. The drain terminal of the switching element Q1 is connected to a positive electrode of the DC power source Vd. The source terminal of the switching element Q1 from which a U-phase AC signal is output is connected to the drain terminal of the switching element Q2. The source terminal of the switching element Q2 is connected to the ground (a negative electrode of the DC power source Vd) via the resistor RO. The gate terminal of the switching element Q1 and the gate terminal of the switching element Q2 are connected to the pre-drive circuit 3.

The V-phase switching leg includes a switching element Q3 of upper arm side and a switching element Q4 of lower arm side. The drain terminal of the switching element Q3 is connected to the positive electrode of the DC power source Vd. The source terminal of the switching element Q3 from which a V-phase AC signal is output is connected to the drain terminal of the switching element Q4. The source terminal of the switching element Q4 is connected to the ground (the negative electrode of the DC power source Vd) via the resistor R0. The gate terminal of the switching element Q3 and the gate terminal of the switching element Q4 are connected to the pre-drive circuit 3.

The W-phase switching leg includes a switching element Q5 of upper arm side and a switching element Q6 of lower arm side. The drain terminal of the switching element Q5 is connected to the positive electrode of the DC power source Vd. The source terminal of the switching element Q5 from which a W-phase AC signal is output is connected to the drain terminal of the switching element Q6. The source terminal of the switching element Q6 is connected to the ground (the negative electrode of the DC power source Vd) via the resistor R0. The gate terminal of the switching element Q5 and the gate terminal of the switching element Q6 are connected to the pre-drive circuit 3.

The inverter circuit 2 includes the switching elements Q1, Q3, and Q5 of upper arm side which are connected between the phases of the coils Lu, Lv, and Lw of the motor 20 and one terminal (the positive terminal) of the DC power source Vd and the switching elements Q2, Q4, and Q6 of lower arm side which are connected between the phases of the coils Lu, Lv, and Lw and the other terminal (the negative terminal) of the DC power source Vd via the resistor R0.

The inverter circuit 2 is supplied with power from the DC power source Vd and supplies three-phase currents to the U-phase wiring, the V-phase wiring, and the W-phase wiring of the motor 20 when the drive signals Vuu to Vw1 are input from the pre-drive circuit 3.

The pre-drive circuit 3 (a part of the motor driver) serves as the motor driver in combination with the connected inverter circuit 2 and is connected to the controller 4. The pre-drive circuit 3 includes, for example, six gate drive circuits and generates the drive signals Vuu to Vw1 for driving the inverter circuit 2.

The detector 7 includes resistors R1 to R6. The back electromotive voltage comparator 5 includes comparators 51, 52, and 53 of the phases. A U-phase node is divided in voltage by the resistors R1 and R2 and is connected to one input terminal of the comparator 51. A V-phase node is divided in voltage by the resistors R3 and R4 and is connected to one input terminal of the comparator 52. A W-phase node is divided in voltage by the resistors R5 and R6 and is connected to one input terminal of the comparator 53. The resistors R1, R3, and R5 have the same resistance value. The resistors R2, R4, and R6 have the same resistance value. Accordingly, the voltage division ratios of the phases are the same. The input terminals on the other side of the comparators 51, 52, and 53 are connected to the advance-angle reference voltage generator 6.

The comparator 51 of the back electromotive voltage comparator 5 includes a non-inverted input terminal, an inverted input terminal, and an output terminal. The comparator 51 outputs a voltage of an L level to the output terminal when the voltage applied to the non-inverted input terminal is lower than the voltage applied to the inverted input terminal. The comparator 51 outputs a voltage of an H level to the output terminal when the voltage applied to the non-inverted input terminal is higher than the voltage applied to the inverted input terminal.

A phase voltage V1 into which an inter-terminal voltage Vu corresponding to an induced voltage of the coil Lu is divided is input to the non-inverted input terminal of the comparator 51. An advance-angle reference voltage $V_Z$ is input to the inverted input terminal of the comparator 51. The comparator 51 compares the phase voltage V1 with the advance-angle reference voltage $V_Z$ and generates a phase signal S2. When the phase voltage V1 is lower (negative) than the advance-angle reference voltage $V_Z$, the phase signal S2 has an L level. When the phase voltage V1 is higher (positive) than the advance-angle reference voltage $V_Z$, the phase signal S2 has an H level.

A phase voltage V2 into which an inter-terminal voltage Vv corresponding to an induced voltage of the coil Lv is divided is input to the non-inverted input terminal of the comparator 52. The advance-angle reference voltage $V_Z$ is input to the inverted input terminal of the comparator 52. The comparator 52 compares the phase voltage V2 with the advance-angle reference voltage $V_Z$ and generates a phase signal S2. When the phase voltage V2 is lower than the advance-angle reference voltage $V_Z$, the phase signal S2 has an L level. When the phase voltage V2 is higher than the advance-angle reference voltage $V_Z$, the phase signal S2 has an H level.

A phase voltage V3 into which an inter-terminal voltage Vw corresponding to an induced voltage of the coil Lw is divided is input to the non-inverted input terminal of the comparator 53. The advance-angle reference voltage $V_Z$ is input to the inverted input terminal of the comparator 53. The comparator 53 compares the phase voltage V3 with the advance-angle reference voltage $V_Z$ and generates a phase signal S2. When the phase voltage V3 is lower than the advance-angle reference voltage $V_Z$, the phase signal S2 has an L level. When the phase voltage V3 is higher than the advance-angle reference voltage $V_Z$, the phase signal S2 has an H level.

In this way, the comparators 51 to 53 of the back electromotive voltage comparator 5 can compare the inter-terminal voltages Vu, Vv, and Vw corresponding to the phase voltages V1 to V3 with the advance-angle reference voltage $V_Z$. The back electromotive voltage comparator 5 outputs the phase signals S2 of the phases to a rotation speed determining unit 41 and an electrification signal generator 42 at cross timings of the advance-angle reference voltage $V_Z$ and the back electromotive voltages V1 to V3 of the phases.

The controller 4 is connected to an external device (not illustrated), the pre-drive circuit 3, and the detector 7. The controller 4 generates a drive control signal S4 based on a rotation speed command signal Sin received from an external device and the phase voltages V1 to V3.

The controller 4 detects the rotation speed of the motor 20 based on the phase voltages V1 to V3 of the phases, increases the advance-angle reference voltage $V_Z$ when the rotation speed moves from a high speed to a low speed, and decreases the advance-angle reference voltage $V_Z$ when the rotation speed moves from a low speed to a high speed. The controller 4 includes the back electromotive voltage comparator 5, the rotation speed determining unit 41 that detects the rotation speed of the motor 20, the advance-angle reference voltage generator 6 that generates the advance-angle reference voltage $V_Z$, and the electrification signal generator 42 that generates the drive control signal S4 based on the phase signals S2, the rotation speed command signal Sin, and a rotation speed determination signal S3.

The back electromotive voltage comparator 5, the advance-angle reference voltage generator 6, the rotation speed determining unit 41, and the electrification signal generator 42 are included in a microcomputer. The back electromotive voltage comparator 5 and the advance-angle reference voltage generator 6 may be arranged outside the microcomputer.

The rotation speed determining unit 41 determines the magnitude of the rotation speed of the motor 20 based on the phase signals S2. The rotation speed determining unit 41 outputs the rotation speed determination signal S1 as the determination result of the rotation speed to the advance-angle reference voltage generator 6 and the electrification signal generator 42.

The electrification signal generator 42 generates the drive control signal S4 in synchronization with the phase signal S2 such that the magnitude of the rotation speed determination signal S1 corresponding to the rotation speed of the motor 20 becomes equal to the magnitude of the rotation speed of the motor 20 indicated by the rotation speed command signal Sin. That is, the electrification signal generator 42 outputs the drive control signal S4 to a drive unit so as to reach the rotation speed of the motor 20 indicated by the rotation speed command signal Sin.

The advance-angle reference voltage generator 6 generates the advance-angle reference voltage $V_Z$ in response to the rotation speed determination signal S1. By generating the advance-angle reference voltage $V_Z$ corresponding to the rotation speed, it is possible to perform optimal advance-angle control depending on the rotation speed.

In other words, by decreasing the advance-angle reference voltage $V_Z$, it is possible to perform control by advance when the rotation speed is high. By increasing the advance-angle reference voltage $V_Z$, it is possible to perform control by lag when the rotation speed is low.

Figure 2:
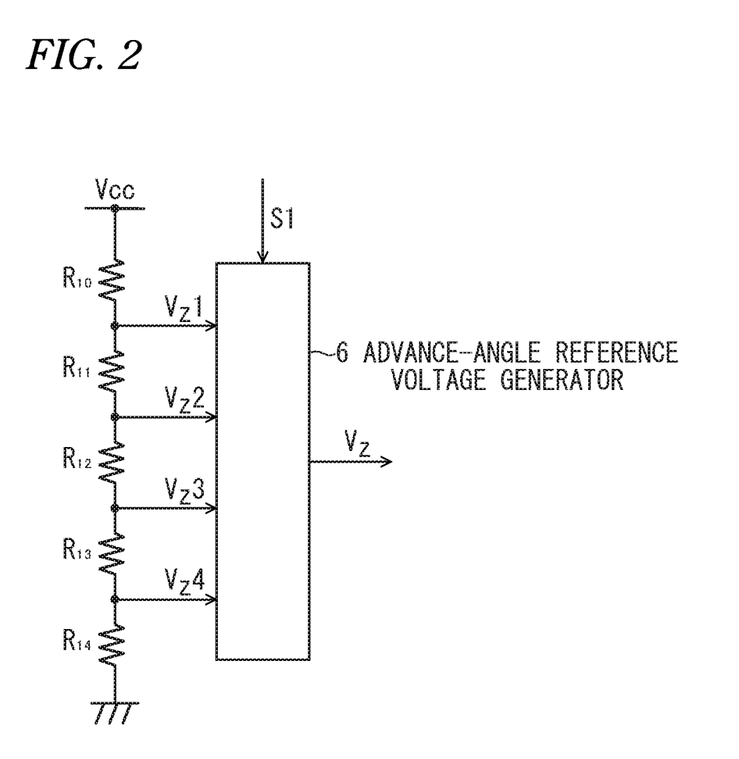
FIG. 2 is a schematic partial configuration diagram illustrating an example of an advance-angle reference voltage generator.

FIG. 2 is a schematic partial configuration diagram illustrating an example of the advance-angle reference voltage generator 6 and illustrates an example in which a source voltage Vcc is divided into four advance-angle reference voltages $V_Z1$, $V_Z2$, $V_Z3$, and $V_Z4$.

As illustrated in FIG. 2, resistors R10, R11, R12, R13, and R14 constitute a voltage division circuit that generates advance-angle reference voltages $V_Z1$ to $V_Z4$ into which the source voltage Vcc is stepwise proportionally divided. An end of the resistor R10 is connected to the source voltage Vcc and the other end thereof is connected to an input terminal of the advance-angle reference voltage $V_Z1$ of the advance-angle reference voltage generator 6. An end of the resistor R11 is connected to the resistor R10 and the other end thereof is connected to an input terminal of the advance-angle reference voltage $V_Z2$ of the advance-angle reference voltage generator 6. An end of the resistor R12 is connected to the resistor R11 and the other end thereof is connected to an input terminal of the advance-angle reference voltage $V_Z3$ of the advance-angle reference voltage generator 6. An end of the resistor R13 is connected to the resistor R12 and the other end thereof is connected to an input terminal of the advance-angle reference voltage $V_Z4$ of the advance-angle reference voltage generator 6. An end of the resistor R14 is connected to the resistor R13 and the other end thereof is connected to the ground.

The advance-angle reference voltage generator 6 sets the advance-angle reference voltages $V_Z1$ to $V_Z1$ corresponding to the amplitudes of the back electromotive voltages generated in the phases when the motor 20 rotates at a predetermined speed. The advance-angle reference voltage generator 6 switches the magnitude of the advance-angle reference voltage $V_Z$ to four steps depending on the rotation speed of the motor 20 detected by the rotation speed determining unit 41. Since the advance-angle reference voltage generator 6 switches the advance-angle reference voltages $V_Z1$ to $V_Z4$ depending on the rotation speed of the motor 20, it is possible to perform optimal advance-angle control depending on the rotation speed.

As illustrated in FIG. 2, the resistors R10 to R14 divide the source voltage Vcc and generates the advance-angle reference voltages $V_Z1$, $V_Z2$, $V_Z3$, and $V_Z4$. The divided voltages (the advance-angle reference voltages $V_Z1$ to $V_Z4$) are input to the input terminals of the advance-angle reference voltage generator 6. The advance-angle reference voltage generator 6 can select the advance-angle reference voltages $V_Z1$ to $V_Z4$ by switching the input terminal to the input terminals of the advance-angle reference voltages $V_Z1$ to $V_Z4$ using a program. The advance-angle reference voltages $V_Z1$ to $V_Z4$ are generated from the source voltage Vcc and thus follow a voltage variation of the source voltage Vcc.

Figure 3:
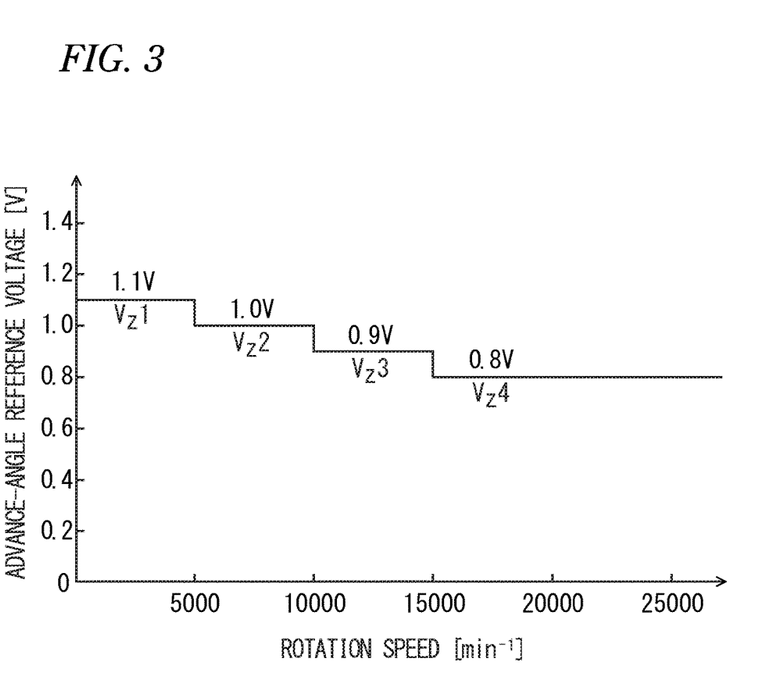
FIG. 3 is a diagram illustrating an example of a relationship between an advance-angle reference voltage and a rotation speed.

Accordingly, even when the back electromotive voltage varies with the voltage variation of the source voltage Vcc, the advance-angle reference voltages $V_Z1$ to $V_Z4$ also vary at the same ratio and it is thus possible to prevent erroneous detection of the cross timing. FIG. 3 is a diagram illustrating an example of a relationship between the advance-angle reference voltages $V_Z1$ to $V_Z4$ and the rotation speed.

As illustrated in FIG. 3, the electrification signal generator 42 switches the advance-angle reference voltage to the advance-angle reference voltages $V_Z1$ to $V_Z4$, which are obtained by causing the advance-angle reference voltage generator 6 to set the advance-angle reference voltage $V_Z$ to stepwise magnitudes in advance, depending on the rotation speed detected by the rotation speed determining unit 41 and generates the drive control signal of each phase of the motor 20 corresponding to the advance-angle reference voltages $V_Z1$ to $V_Z4$. The advance-angle reference voltage generator 6 stepwise increases the advance-angle reference voltage $V_Z$ when the rotation speed of the motor 20 moves from a high speed to a low speed, and stepwise decreases the advance-angle reference voltage $V_Z$ when the rotation speed of the motor 20 moves from a low speed to a high speed.

For example, the advance-angle reference voltage generator 6 sets the advance-angle reference voltage $V_Z1$ to 1.1 [V] when the rotation speed of the motor 20 is in a rotation speed area equal to or higher than 0 [min$^{-1}$] and lower than 5,000 [min$^{-1}$]. The advance-angle reference voltage generator 6 sets the advance-angle reference voltage $V_Z2$ to 1.0 [V] when the rotation speed of the motor 20 is in a rotation speed area equal to or higher than 5,000 [min$^-$] and lower than 10,000 [min$^{-1}$]. The advance-angle reference voltage generator 6 sets the advance-angle reference voltage $V_Z3$ to 0.9 [V] when the rotation speed of the motor 20 is in a rotation speed area equal to or higher than 10,000 [min$^{-1}$] and lower than 15,000 [min$^{-1}$]. The advance-angle reference voltage generator 6 sets the advance-angle reference voltage $V_Z4$ to 0.8 [V] when the rotation speed of the motor 20 is in a rotation speed area equal to or higher than 15,000 [min$^{-1}$].

Figure 4:
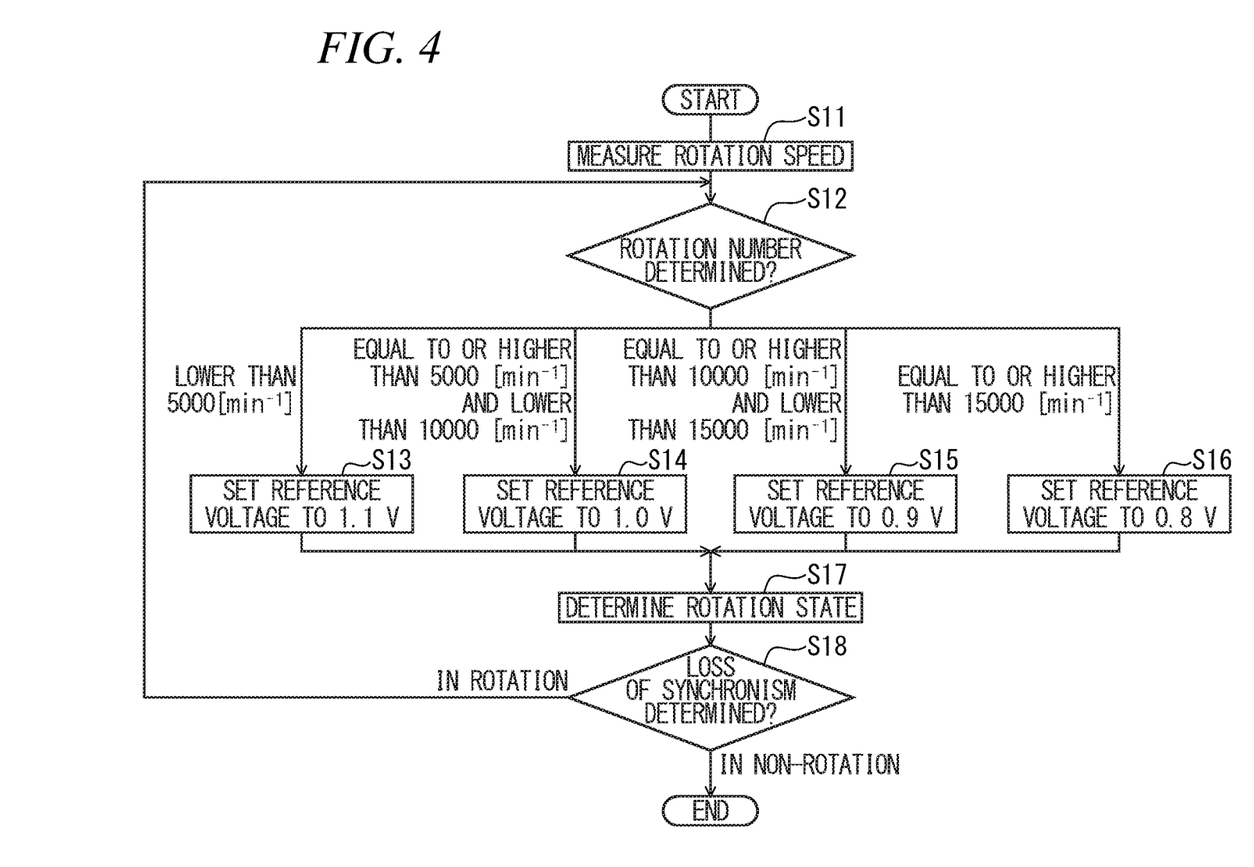
FIG. 4 is a flowchart illustrating an example of an advance-angle reference voltage switching process.

FIG. 4 is a flowchart illustrating an example of an advance-angle reference voltage switching process.

A generic system managing the drive controller 1 (see FIG. 1) turns on and starts the drive controller 1.

Then, the drive controller 1 receives inputs of the induced voltages (back electromotive voltages) V1 to V3 of the phases from the motor 20 (see FIG. 1). The induced voltages (back electromotive voltages) generated in the coils Lu, Lv, and Lw are input to the drive controller 1.

The controller 4 (see FIG. 1) initializes the advance-angle reference voltage generator 6 and the rotation speed determining unit 41 of the controller 4 for the purpose of determination of a rotation speed. The advance-angle reference voltage generator 6 generates the advance-angle reference voltage $V_Z$ which is a predetermined positive voltage by the initialization. The rotation speed determining unit 41 resets the internal state by the initialization and starts a rotation speed determining operation.

In step S11, the controller 4 receives a rotation speed instruction from the generic system. The electrification signal generator 42 changes the rotation speed by changing the drive control signal S4 based on the rotation speed instruction.

In step S12, the rotation speed determining unit 41 determines the magnitude of the detected rotation speed of the motor 20 based on the output of the back electromotive voltage comparator 5. Specifically, the advance-angle reference voltage generator 6 generates the advance-angle reference voltage $V_Z$ which is a predetermined positive voltage, and the back electromotive voltage comparator 5 compares the phase voltages into which the back electromotive voltages V1 to V3 of the phases of the motor 20 are divided with the advance-angle reference voltage $V_Z$. The rotation speed determining unit 41 determines the magnitude of the rotation speed of the motor 20 based on the signs of the phase voltages of the other phases with respect to the advance-angle reference voltage $V_Z$ at the cross timings of the phase voltage of a reference phase and the advance-angle reference voltage $V_Z$.

For example, when the rotation speed determining unit 41 determines that the rotation speed (rotation speed area) of the motor 20 is in the rotation speed area equal to or higher than 0 [min$^{-1}$] and lower than 5,000 [min$^{-1}$], the advance-angle reference voltage generator 6 sets the advance-angle reference voltage $V_Z1$ to 1.1 [V] (step S13).

When the rotation speed determining unit 41 determines that the rotation speed of the motor 20 is in the rotation speed area equal to or higher than 5,000 [min$^{-1}$] and lower than 10,000 [min$^{-1}$], the advance-angle reference voltage generator 6 sets the advance-angle reference voltage $V_Z2$ to 1.0 [V] (step S14).

When the rotation speed determining unit 41 determines that the rotation speed of the motor 20 is in the rotation speed area equal to or higher than 10,000 [min$^{-1}$] and lower than 15,000 [min$^{-1}$], the advance-angle reference voltage generator 6 sets the advance-angle reference voltage $V_Z3$ to 0.9 [V] (step S15).

When the rotation speed determining unit 41 determines that the rotation speed of the motor 20 is in the rotation speed area equal to or higher than 15,000 [min$^{-1}$], the advance-angle reference voltage generator 6 sets the advance-angle reference voltage $V_Z4$ to 0.8 [V] (step S16).

In step S18, the controller 4 determines whether the motor 20 loses synchronism. When it is determined that the motor 20 does not lose synchronization, the controller 4 maintains the rotation of the motor 20 (in rotation) and repeatedly performs detecting the rotation speed of the motor 20 (step S11), determining the rotation speed (step S12), setting the advance-angle reference voltages $V_Z1$ to $V_Z4$ (steps S13 to S16), determining the rotation state (step S 17), and determining whether the motor loses synchronization (step S18).

When it is determined in step S18 that the motor loses synchronization, the controller 4 performs a process of stopping the motor 20. When the motor 20 is stopped (in non-rotation), the process after the determination of loss of synchronization ends. That is, the process of driving the motor 20 ends.

As described above, the drive controller 1 of the motor 20 according to this embodiment includes the advance-angle reference voltage generator 6 that generates the advance-angle reference voltage $V_Z$, the back electromotive voltage comparator 5 that generates the phase signals S2 of the phases at the cross timings of the advance-angle reference voltage $V_Z$ and the phase voltages V1 to V3 of the phases of the motor 20, the rotation speed determining unit 41 that determines the rotation speed of the motor 20 based on the phase signals S2, and the electrification signal generator 42 that generates the drive control signal S4 based on the rotation speed detected by the rotation speed determining unit 41, the phase signals S2, and the rotation speed command signal Sin.

Accordingly, since the drive controller 1 can perform more optimal advance-angle control depending on the rotation speed of the motor 20, it is possible to avoid loss of synchronization when the rotation speed of the motor 20 moves from a low speed to a high speed. In addition, the drive controller 1 can perform optimal advance-angle control when the rotation speed of the motor 20 moves from a low speed to a high speed. Accordingly, it is possible to enhance driving efficiency of the motor 20.

The present invention is not limited to the above-mentioned embodiment, but can be modified in various forms without departing from the gist of the present invention. For example, the following modified examples (a) to (h) can be considered.

(a) In the above-mentioned embodiment, as examples of the drive signals Vuu to Vwl from the pre-drive circuit 3 which are input to the inverter circuit 2, the drive signals of the upper-arm switching elements Q1, Q3, and Q5 are PWM control signals and the drive signals of the lower-arm switching elements Q2, Q4, and Q6 are phase-switching signals. The present invention is not limited to this example.

For example, the drive signals of the upper-arm switching elements Q1, Q3, and Q5 may be phase-switching signals and the drive signals of the lower-arm switching elements Q2, Q4, and Q6 may be PWM control signals. That is, the upper arm side and the lower arm side may be reversed.

In this case, the controller 4 is configured to detect the rotation speed of the motor 20 based on the phase signals S2 of the phases, to decrease the advance-angle reference voltage $V_Z$ when the rotation speed moves from a high speed to a low speed, and to increase the advance-angle reference voltage $V_Z$ when the rotation speed moves from a low speed to a high speed.

By employing this configuration, the logic of the advance-angle reference voltage $V_Z$ which is generated by the advance-angle reference voltage generator 6 is inverted. That is, the advance-angle reference voltage $V_Z$ is decreased when the rotation speed moves to a low speed, and the advance-angle reference voltage $V_Z$ is increased when the rotation speed moves to a high speed.

Even when the PWM control is employed on the lower arm side in this way, similarly to the above-mentioned embodiment, it is possible to avoid loss of synchronization by performing the optimal advance-angle control.

(b) At least a part of the elements of the drive controller 1 according to the above-mentioned embodiment may be embodied by software, instead of hardware.

(c) The motor 20 is not limited to the three-phase brushless motor but may be another type of motor. The number of phases of the motor 20 is not limited to three.

(d) The drive mode of the motor 20 is not limited to the sinusoidal drive mode but may be, for example, a rectangular wave drive mode.

(e) At least a part of the drive controller 1 may be an integrated circuit (IC).

(f) The predetermined advance-angle reference voltage $V_Z$ depending on the rotation speed of the motor 20 may be set to an appropriate value based on a theory, a measurement result, or the like and may be stored in a storage unit (not illustrated). The values of the advance-angle reference voltages $V_Z1$ to $V_Z4$ depending on the rotation speed of the motor 20 may be stored in the storage unit.

(g) A hysteresis may be provided to the variation in the advance-angle reference voltage accompanied with the variation in the rotation speed.

(h) The variation in the advance-angle reference voltage accompanied with the variation in the rotation speed is not limited to a stepwise variation, but may be set to a linear or nonlinear variation.

As described with reference to the embodiment and modified examples, the correlation (logic) between the reference voltage and the rotation speed is established in upper pulse width modulation (PWM), and the reverse logic thereof is established in lower PWM.

According to the present invention, it is possible to provide a motor drive controller and a method for controlling a motor that can avoid loss of synchronism by performing more optimal advance-angle control.

What is claimed is:

1. A motor drive controller comprising:
an advance-angle reference voltage generator that generates an advance-angle reference voltage;
a back electromotive voltage comparator that generates phase signals of phases at a cross timing of the advance-angle reference voltage and back electromotive voltages of phases of a motor; and
a controller that operates to perform a process including:
detecting a rotation speed of the motor based on the phase signals of the phases;
increasing the advance-angle reference voltage when the rotation speed moves from a high speed to a low speed; and
decreasing the advance-angle reference voltage when the rotation speed moves from a low speed to a high speed.

2. The motor drive controller according to claim 1,
wherein the controller operates to perform the process further including:
detecting a rotation speed of the motor; and
generating drive control signals of the phases of the motor based on the rotation speed detected by the rotation speed determining unit, the phase signals, and a rotation speed command signal received from an external device.

3. The motor drive controller according to claim 1,
wherein the advance-angle reference voltage generator decreases or increases the advance-angle reference voltage in stepwise depending on rotation speed areas which are set stepwise depending on the magnitude of the rotation speed when the rotation speed of the motor moves from a low speed to a high speed or from a high speed to a low speed.

4. The motor drive controller according to claim 1,
wherein the advance-angle reference voltage generator generates the advance-angle reference voltage by dividing a source voltage.

5. A motor drive controller comprising:
an advance-angle reference voltage generator that generates an advance-angle reference voltage;
a back electromotive voltage comparator that generates phase signals of phases at a cross timing of the advance-angle reference voltage and back electromotive voltages of phases of a motor; and
a controller that operates to perform a process including:
detecting a rotation speed of the motor based on the phase signals of the phases;
decreasing the advance-angle reference voltage when the rotation speed moves from a high speed to a low speed; and
increasing the advance-angle reference voltage when the rotation speed moves from a low speed to a high speed.

6. The motor drive controller according to claim 5,
wherein the controller operates to perform the process further including:
detecting a rotation speed of the motor; and
generating drive control signals of the phases of the motor based on the rotation speed detected by the rotation speed determining unit, the phase signals, and a rotation speed command signal received from an external device.

7. The motor drive controller according to claim 5,
wherein the advance-angle reference voltage generator decreases or increases the advance-angle reference voltage in stepwise depending on rotation speed areas which are set stepwise depending on the magnitude of the rotation speed when the rotation speed of the motor moves from a low speed to a high speed or from a high speed to a low speed.

8. The motor drive controller according to claim 5, wherein the advance-angle reference voltage generator generates the advance-angle reference voltage by dividing a source voltage.

* * * * *